(12) United States Patent
Kang et al.

(10) Patent No.: US 11,046,306 B2
(45) Date of Patent: Jun. 29, 2021

(54) AUTOMATIC PARKING CONTROL APPARATUS AND AUTOMATIC PARKING CONTROL METHOD

(71) Applicant: MANDO CORPORATION, Gyeonggi-do (KR)

(72) Inventors: Tae Seok Kang, Gyeonggi-do (KR); Hyeong Min Woo, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 284 days.

(21) Appl. No.: 15/960,530

(22) Filed: Apr. 23, 2018

(65) Prior Publication Data

US 2018/0304885 A1 Oct. 25, 2018

(30) Foreign Application Priority Data

Apr. 25, 2017 (KR) .................... 10-2017-0052671

(51) Int. Cl.
B60W 30/06 (2006.01)

(52) U.S. Cl.
CPC ......... B60W 30/06 (2013.01); *B60W 2556/65* (2020.02)

(58) Field of Classification Search
CPC ......... B60W 2554/80; B60W 2556/65; B60W 30/06; G07B 15/02; G08G 1/142; G08G 1/146; H04N 7/18; G06K 9/00791
See application file for complete search history.

(56) References Cited

U.S. PATENT DOCUMENTS 7,303,057 B2 * 12/2007 Yamamoto ............. B60T 1/005
192/219.4
7,706,944 B2 * 4/2010 Tanaka ............... B62D 15/0275
701/41

(Continued)

FOREIGN PATENT DOCUMENTS

| CN | 1705841 | 12/2005 |
| CN | 1793785 | 6/2006 |

(Continued)

OTHER PUBLICATIONS

Office Action dated Oct. 12, 2020 for Chinese Patent Application No. 201810371901.X and its English translation by Google Translate.

(Continued)

*Primary Examiner* — Jeff A Burke
*Assistant Examiner* — Joshua Alexander Garza
(74) *Attorney, Agent, or Firm* — Ladas & Parry, LLP

(57) ABSTRACT

An automatic parking control apparatus includes a vehicle state determiner configured to determine whether a host vehicle is in a double-parked state in which a gear state of the host vehicle is neutral (N) and a starting state of the host vehicle is off, a movement detector configured to, when it is determined that the host vehicle is in the double-parked state, detect whether the host vehicle is moving, a parking space detector configured to, when it is detected that the host vehicle is moving, perform monitoring in a direction opposite to that of the detected movement and detect a parking space, and a controller configured to, when the parking space is detected, calculate a travel path for parking the host vehicle in the detected parking space and control the host vehicle so that the host vehicle is parked along the travel path.

18 Claims, 11 Drawing Sheets

(56) References Cited

U.S. PATENT DOCUMENTS

| | | | | |
|---|---|---|---|---|
| 9,878,709 | B2* | 1/2018 | Gusikhin | G08G 1/14 |
| 10,144,397 | B2* | 12/2018 | Lim | B60T 7/22 |
| 2016/0144857 | A1* | 5/2016 | Ohshima | G08G 1/04 |
| | | | | 701/23 |
| 2017/0137024 | A1* | 5/2017 | Elie | G06K 9/00812 |
| 2017/0355307 | A1* | 12/2017 | Ha | B60Q 9/005 |
| 2019/0375397 | A1* | 12/2019 | Bae | B62D 15/027 |

FOREIGN PATENT DOCUMENTS

| | | |
|---|---|---|
| CN | 103569107 | 2/2014 |
| CN | 106394674 | 2/2017 |
| CN | 106484275 | 3/2017 |
| KR | 10-2013-0128987 | 11/2013 |
| KR | 10-2015-0055852 | 5/2015 |
| KR | 10-2017-0027635 | 5/2017 |

OTHER PUBLICATIONS

Office Action dated Apr. 30, 2021 for Korean Patent Application No. 10-2017-0052671 and its English translation from Global Dossier.

* cited by examiner

AUTOMATIC PARKING CONTROL APPARATUS AND AUTOMATIC PARKING CONTROL METHOD

CROSS REFERENCE TO RELATED APPLICATION

This application claims priority from Korean Patent Application No. 10-2017-0052671, filed on Apr. 25, 2017, which is hereby incorporated by reference for all purposes as if fully set forth herein.

BACKGROUND OF THE INVENTION

1. Field of the Invention

The present disclosure relates to an automatic parking control apparatus capable of being applied to double-parked vehicles.

2. Description of the Prior Art

Recently, the number of vehicles has increased, but due to limited parking spaces, it is not easy to find an empty parking space.

Due to such a situation, a driver has no choice but to double-park, but a double-parked host vehicle may cause various problems.

Such problems will be described in detail using FIGS. 1A and 1B, which are views illustrating examples of situations that may occur in a situation in which a host vehicle is double-parked.

FIG. 1A illustrates a situation in which, due to the absence of parking space, a host vehicle 110 is double-parked next to another vehicle 120.

In such a situation, the double-parked host vehicle 110 may be parked in a neutral (N) gear state. This is to allow the host vehicle 110 to be moved so that the other vehicle 120 may exit the parking space.

Referring to FIG. 1B, a driver of the other vehicle 120 may apply an external force to the host vehicle 110 to move the host vehicle 110 (S1), and then enable the other vehicle 120 to exit the parking space (S2).

As described above, a double-parked host vehicle may be moved to another position, which is not the initial position at which the host vehicle was double-parked. This may cause a problem in that a driver of the host vehicle is unable to find the host vehicle.

Further, there is a problem in that the host vehicle is left double-parked even when the other vehicle has exited the parking space and an empty parking space is present.

SUMMARY OF THE INVENTION

In this background, an aspect of the present disclosure is directed to providing an automatic parking control apparatus and an automatic parking control method capable of, when a parking space becomes available in a situation in which a host vehicle is double-parked, parking the host vehicle in the parking space.

Another aspect of the present disclosure is directed to providing an automatic parking control apparatus and an automatic parking control method capable of, even when a double-parked host vehicle is moved by another person, allowing the host vehicle so that the host vehicle is easily found.

According to an aspect, the present disclosure provides an automatic parking control apparatus including a vehicle state determiner configured to determine whether a host vehicle is in a double-parked state in which a gear state of the host vehicle is neutral (N) and a starting state of the host vehicle is off, a movement detector configured to, when it is determined that the host vehicle is in the double-parked state, detect whether the host vehicle is moving, a parking space detector configured to, when it is detected that the host vehicle is moving, perform monitoring in a direction opposite to that of the detected movement and detect a parking space, and a controller configured to, when the parking space is detected, calculate a travel path for parking the host vehicle in the detected parking space and control the host vehicle so that the host vehicle is parked along the travel path.

According to another aspect, the present disclosure provides an automatic parking control method including a vehicle state determining step in which it is determined whether a host vehicle is in a double-parked state in which a gear state of the host vehicle is neutral (N) and a starting state of the host vehicle is off, a movement detecting step in which, when it is determined that the host vehicle is in the double-parked state, whether the host vehicle is moving is detected, a parking space detecting step in which, when it is detected that the host vehicle is moving, monitoring in a direction opposite to that of the detected movement is performed and a parking space is detected, and a controlling step in which, when the parking space is detected, a travel path for parking the host vehicle in the detected parking space is calculated and the host vehicle is controlled so that the host vehicle is parked along the travel path.

BRIEF DESCRIPTION OF THE DRAWINGS

The above and other aspects, features and advantages of the present disclosure will be more apparent from the following detailed description taken in conjunction with the accompanying drawings, in which.

Figure 1A:
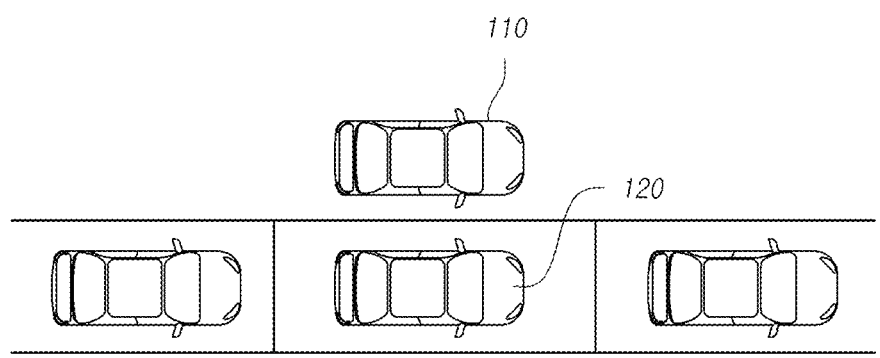
FIGS. 1A and 1B are views illustrating examples of situations that may occur in a situation in which a host vehicle is double-parked.
Figure 1B:
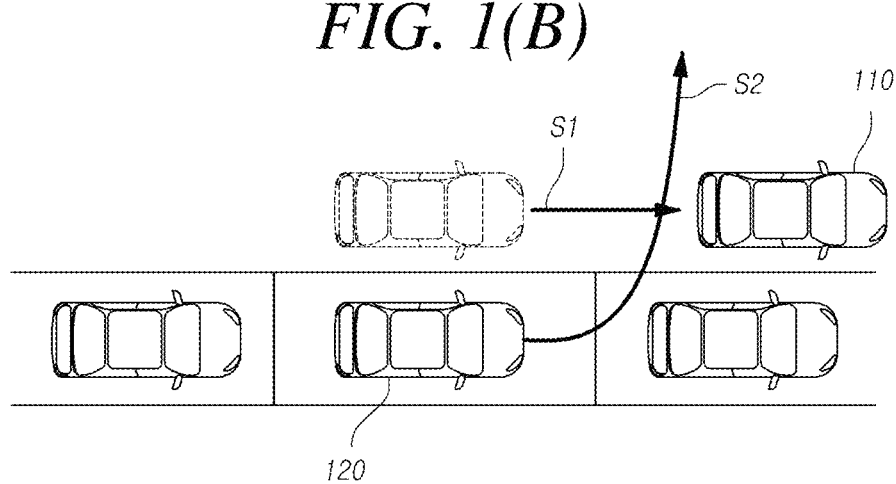

DETAILED DESCRIPTION OF THE
EXEMPLARY EMBODIMENTS

Hereinafter, some embodiments of the present disclosure will be described in detail with reference to the accompanying drawings. In adding reference numerals to elements in each drawing, the same elements will be designated by the same reference numerals when possible, even if they are shown in different drawings. Further, in the following description of the present disclosure, a detailed description of known functions and configurations incorporated herein will be omitted when it is determined that the description may make the subject matter of the present disclosure rather unclear.

In describing elements of the present disclosure, the terms "first," "second," "A," "B," "(a)," "(b)," and the like may be used. Such terms are merely used to distinguish an element from another element, and the essence, sequence, order, number or the like of a corresponding element is not limited by the terms. When a certain element is described as being "connected," "coupled," or "linked," to another element, it should be understood that, although the element may be directly connected or linked to the other element, another element may be "interposed" between the elements, or the elements may be "connected," "coupled," or "linked" via another element.

Figure 2:
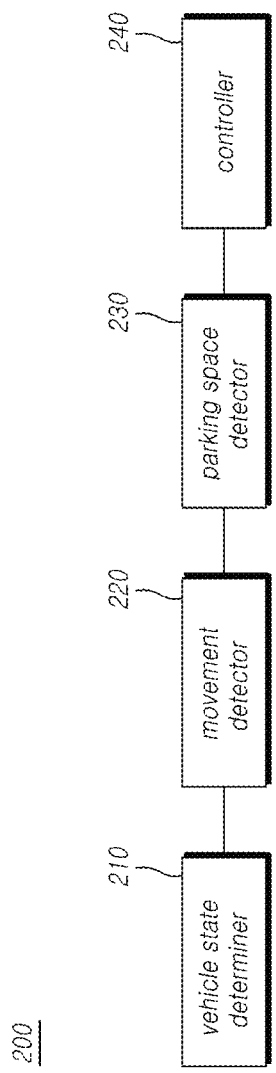
FIG. 2 is a view illustrating a configuration of an automatic parking control apparatus according to a first embodiment of the present disclosure.

FIG. 2 is a view illustrating a configuration of an automatic parking control apparatus according to a first embodiment of the present disclosure.

Referring to FIG. 2, an automatic parking control apparatus 200 according to a first embodiment of the present disclosure may include a vehicle state determiner 210 configured to determine whether a host vehicle is in a double-parked state in which a gear state of the host vehicle is neutral (N) and a starting state of the host vehicle is off, a movement detector 220 configured to, when it is determined that the host vehicle is in the double-parked state, detect whether the host vehicle is moving, a parking space detector 230 configured to, when it is detected that the host vehicle is moving, perform monitoring in a direction opposite to that of the detected movement and detect a parking space, and a controller 240 configured to, when the parking space is detected, calculate a travel path for parking the host vehicle in the detected parking space and control the host vehicle so that the host vehicle is parked along the travel path.

When the gear state of the host vehicle is determined as neutral (N) on the basis of information related to the gear received from a gear sensor configured to sense the gear state of the host vehicle, and the starting state of the host vehicle is determined as being off on the basis of information received from a starting sensor configured to detect the starting state of the host vehicle, the vehicle state determiner 210 of the automatic parking control apparatus 200 according to the first embodiment of the present disclosure may determine that the host vehicle is in the double-parked state.

As an example, the gear sensor may detect a currently-engaged gear by detecting a change in accordance with the position of a gear rod or a change in accordance with an engaged gear (e.g., a number of rotations or the like in accordance with a engaged gear ratio), but embodiments are not limited thereto.

The starting sensor may detect a current starting state of the host vehicle by detecting a change in accordance with the position of a starting key or a change in accordance with starting (e.g., a fuel flow or the like), but embodiments are not limited thereto.

When it is determined by the vehicle state determiner 210 that the host vehicle is in the double-parked state, the movement detector 220 of the automatic parking control apparatus 200 according to the first embodiment of the present disclosure may detect whether the host vehicle is moving, on the basis of information received from an activated movement sensor.

The movement sensor may include a wheel speed sensor capable of detecting a wheel speed in accordance with movement of the host vehicle, an acceleration sensor capable of detecting an acceleration in accordance with movement of the host vehicle, or the like.

When it is detected by the movement detector 220 that the host vehicle is moving, the parking space detector 230 of the automatic parking control apparatus 200 according to the first embodiment of the present disclosure may detect a parking space on the basis of information received from an activated object sensor.

In this case, the activated object sensor may be limited to an object sensor configured to perform monitoring in the direction opposite to that of the movement detected by the movement detector 220, and the object sensor may be a camera, a radar, a LIDAR (light detection and ranging), or an ultrasonic sensor.

When it is detected that the host vehicle is moving, the parking space detector 230 may search for and detect, after movement of the host vehicle is completed, a parking space while moving the host vehicle in the direction opposite to that in which the host vehicle has been moved. For example, the double-parked host vehicle may be moved in a specific direction by an external force for another vehicle to exit a parking space. In this case, the host vehicle may be moved a predetermined distance in a specific direction by an external force, and when the movement is completed, the host vehicle may perform, while traveling in a direction opposite to that of the movement caused by the external force, a parking space search for checking whether a parking space is present or whether parking in a parking space is possible. That is, in a case in which the host vehicle is moved to enable the other vehicle to exit the parking space, to search for a space in which the other vehicle was parked after the exit of the other vehicle is completed, the parking space detector 230 may control the host vehicle so that the host vehicle is moved to the corresponding position and scan a parking space. In this way, parking space search accuracy can be improved relative to detecting a parking space in a direction opposite to that of the movement of the host vehicle while the host vehicle is stationary at the position to which the host vehicle has been moved. Traveling of the host vehicle after movement thereof is completed is allowed to be performed after completion of the exit of the other vehicle is confirmed. In this way, safety can be ensured.

Alternatively, in a process of traveling for the purpose of double-parking, the host vehicle may scan parking spaces at sides and save parking space scan information. In this case, when movement of the host vehicle is detected in the double-parked state, the parking space detector 230 may further detect information of another vehicle exiting a parking space, compare the information of the other vehicle exiting the parking space with the parking space scan information, and detect and determine whether the host vehicle is able to be parked in the space in which the corresponding other vehicle was parked. For example, in a case in which the host vehicle travels for the purpose of double-parking, a parking space may be detected using sensors inside and outside the host vehicle, up to a position at which the host vehicle is double-parked. In this case, pieces of information on a parking space, the position of the corresponding parking space, the type and size of another vehicle parked in the parking space, and the like may be mapped to the parking space scan information and saved. Therefore, the parking space detector 230 may compare information on another vehicle which is detected in a case in which the host vehicle is moved by an external force after double-parking is completed and the other vehicle exits a parking space, with information on another vehicle mapped to the parking space scan information and saved, check pieces of information on the position of the parking space, the size of the parking space, and the like mapped to the other vehicle exiting the parking space, and determine whether it is possible to park the host vehicle in the corresponding parking space. This allows a parking space to be more accurately found without additional movement of the host vehicle.

Furthermore, the parking space detector 230 may further detect information on the other vehicle exiting the parking space, compare a detected length or width of the other vehicle with a known length or width of the host vehicle, and further detect whether it is possible to park the host vehicle in the parking space.

As an example, when the detected width of the other vehicle is larger than the width of the host vehicle, the parking space detector 230 may detect that it is possible to park the host vehicle in the parking space in which the other vehicle, which exited the parking space, was parked. Conversely, when the detected width of the other vehicle is smaller than the width of the host vehicle, the parking space detector 230 may detect that it is not possible to park the host vehicle in the parking space in which the other vehicle, which exited the parking space, was parked.

As another example, when the detected length of the other vehicle is larger than the length of the host vehicle, the parking space detector 230 may detect that it is possible to park the host vehicle in the parking space in which the other vehicle, which exited the parking space, was parked. Conversely, when the detected length of the other vehicle is smaller than the length of the host vehicle, the parking space detector 230 may detect that it is not possible to park the host vehicle in the parking space in which the other vehicle, which exited the parking space, was parked.

When the parking space is detected by the parking space detector 230, the controller 240 of the automatic parking control apparatus 200 according to the first embodiment of the present disclosure may calculate a travel path for parking the host vehicle in the detected parking space and control the host vehicle so that the host vehicle is parked along the travel path.

The travel path may be calculated on the basis of a movement path of the host vehicle in accordance with a known controllable steering angle. The controller 240 may control a steering device and a brake device of the host vehicle to park the host vehicle along the travel path.

According to the automatic parking control apparatus 200 according to the first embodiment of the present disclosure operated as described above, in a case in which a driver of another vehicle moves a double-parked host vehicle to enable the other vehicle, which is parked, to exit a parking space, there is an advantageous effect in that the host vehicle can be parked in the parking space in which the other vehicle was parked.

In contrast to the automatic parking control apparatus according to the first embodiment of the present disclosure illustrated in FIG. 2, an automatic parking control apparatus according to a second embodiment of the present disclosure may further include a movement distance detector configured to, when movement of a host vehicle is detected, detect a movement distance of the host vehicle. Thus, a controller may further include a function of, when a parking space is not detected, using a detected movement distance of the host vehicle and controlling the host vehicle so that the host vehicle returns to an initial position at which the host vehicle was double-parked.

As an example, when movement of the host vehicle is detected, the movement distance detector may integrate a steering angle and a speed of the host vehicle and detect a movement distance of the host vehicle.

The automatic parking control apparatus according to the second embodiment of the present disclosure operated as described above may allow a host vehicle to return to an initial position at which the host vehicle was double-parked, even after a driver of another vehicle has moved the double-parked host vehicle to enable the other vehicle, which is parked, to exit a parking space. Thus, there is an advantageous effect of allowing a driver of the host vehicle to easily find the host vehicle.

In contrast to the automatic parking control apparatus according to the first embodiment of the present disclosure illustrated in FIG. 2, an automatic parking control apparatus according to a third embodiment of the present disclosure may further include a transmitter capable of providing information to a driver of a host vehicle.

As an example, a driver of a host vehicle may input information on a device (e.g., terminal) owned by the driver into the transmitter for the transmitter to provide information to the driver of the host vehicle.

When movement of the host vehicle is detected, the transmitter may transmit information on the detected movement to the driver of the host vehicle.

Alternatively, when the host vehicle is parked along the travel path, the transmitter may transmit information on a parking space in which the host vehicle is parked to the driver of the host vehicle.

In a case in which a host vehicle is moved by a driver of another vehicle or is moved to be parked in an empty parking space, the automatic parking control apparatus according to the third embodiment of the present disclosure operated as described above may provide information to a driver of the host vehicle. Thus, there is an advantageous effect of allowing the driver of host vehicle to be aware of the fact that the host vehicle is not located at an initial position at which the host vehicle was double-parked.

In contrast to the automatic parking control apparatus according to the first embodiment of the present disclosure illustrated in FIG. 2, an automatic parking control apparatus according to a fourth embodiment of the present disclosure may further include a transmitter capable of, when movement of a host vehicle is detected, providing information to a movement distance detector, which is configured to detect a movement distance of the host vehicle, and a driver of the host vehicle.

As an example, the driver of the host vehicle may input information on a device (e.g., terminal) owned by the driver into the transmitter for the transmitter to provide information to the driver of the host vehicle.

Thus, when a parking space is not detected, the transmitter may transmit information on a detected movement distance of the host vehicle to the driver of the host vehicle.

In addition to an advantageous effect of informing the driver of the host vehicle of the fact that the host vehicle is not located at an initial position at which the host vehicle was double-parked, the automatic parking control apparatus according to the fourth embodiment of the present disclosure operated as described above has an advantageous effect of informing the driver of the host vehicle of the position at which the host vehicle is present.

In contrast to the automatic parking control apparatus according to the first embodiment of the present disclosure illustrated in FIG. 2, an automatic parking control apparatus according to a fifth embodiment of the present disclosure may further include a transmitter-receiver capable of exchanging information with a driver of a host vehicle.

As an example, a driver of a host vehicle may input information on a device (e.g., terminal) owned by the driver into the transmitter-receiver and input information on the transmitter-receiver into the owned device for the transmitter-receiver and the driver of the host vehicle to exchange information.

Thus, the transmitter-receiver may transmit information on an order request for detecting a parking space to the driver of the host vehicle and receive information on an order of the driver related thereto, and an operation of detecting a parking space, which is performed by the parking space detector, may be determined in accordance with the received order of the driver.

Alternatively, the transmitter-receiver may transmit information on an order request for parking in a detected parking space to the driver of the host vehicle and receive information on an order of the driver related thereto, and an operation of parking in the parking space, which is performed by the controller, may be determined in accordance with the received order of the driver.

In addition to an advantageous effect of informing the driver of the host vehicle of a situation of a parking area around the host vehicle, the automatic parking control apparatus according to the fifth embodiment of the present disclosure operated as described above has an advantageous effect of being operated in accordance with an order input by the driver of the host vehicle.

Operations of the above-described automatic parking control apparatuses according to the first to fifth embodiments will be described in detail below using FIGS. 3 to 10.

Figure 3:
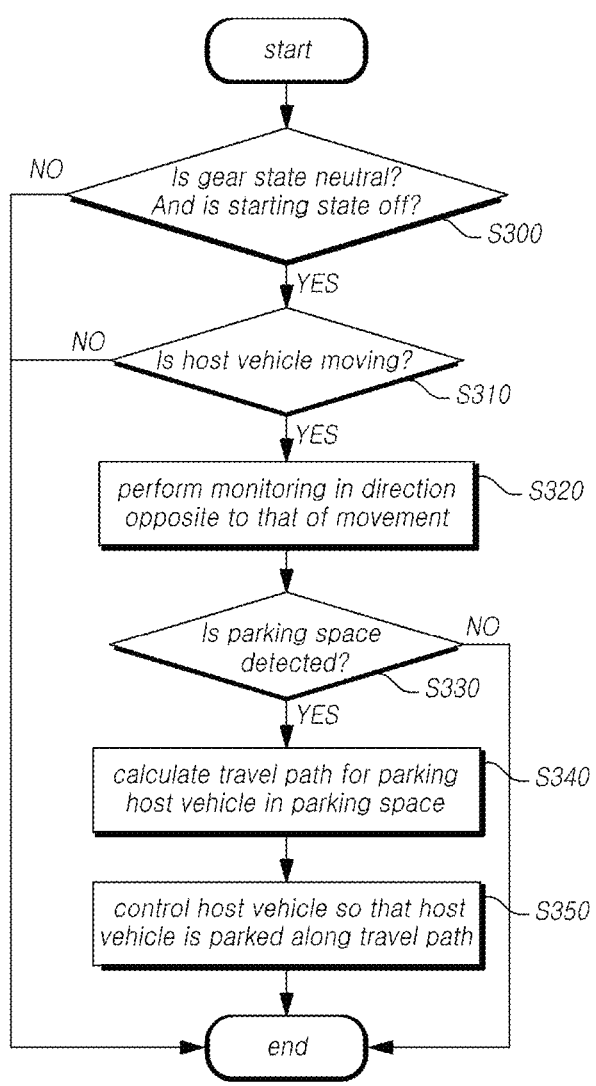
FIG. 3 is a view illustrating an example for describing an operation of the automatic parking control apparatus according to the first embodiment of the present disclosure.

FIG. 3 is a view illustrating an example for describing an operation of the automatic parking control apparatus according to the first embodiment of the present disclosure.

Referring to FIG. 3, the vehicle state determiner of the automatic parking control apparatus according to the first embodiment of the present disclosure may determine whether a gear state of a host vehicle is neutral (N) on the basis of information on the gear received from the gear sensor configured to detect the gear state of the host vehicle, and may determine whether the starting state of the host vehicle is off on the basis of information received from the starting sensor configured to detect the starting state of the host vehicle (S300).

As an example, the gear sensor may detect a currently-engaged gear by detecting a change in accordance with the position of a gear rod or a change in accordance with an engaged gear (e.g., a number of rotations or the like in accordance with an engaged gear ratio), but embodiments are not limited thereto.

The starting sensor may detect a current starting state of the host vehicle by detecting a change in accordance with the position of a starting key or a change in accordance with starting (e.g., a fuel flow or the like), but embodiments are not limited thereto.

In Step S300, when it is determined that the host vehicle is in a double-parked state in which the gear state is neutral (N), and the starting state is off (YES), the movement detector of the automatic parking control apparatus according to the first embodiment of the present disclosure may determine whether the host vehicle is moving (S310).

The movement sensor may include a wheel speed sensor capable of detecting a wheel speed in accordance with movement of the host vehicle, an acceleration sensor capable of detecting an acceleration in accordance with movement of the host vehicle, or the like.

In Step S310, when it is determined that the host vehicle is moving (YES), the parking space detector of the automatic parking control apparatus according to the first embodiment of the present disclosure may perform monitoring in a direction opposite to that of the detected movement (S320) and determine whether a parking space is detected (S330).

As an example, the parking space detector may use an object sensor installed to perform monitoring in a direction opposite to that of the detected movement and perform monitoring in the direction opposite to that of the movement.

The object sensor may be a camera, a radar, a LIDAR, or an ultrasonic sensor.

In Step S330, when it is determined that a parking space is detected (YES), the controller of the automatic parking control apparatus according to the first embodiment of the present disclosure may calculate a travel path for parking the host vehicle in the detected parking space (S340) and control the host vehicle so that the host vehicle is parked in the parking space along the calculated travel path (S350).

As an example, the controller may calculate the travel path on the basis of a movement path of the host vehicle in accordance with a known controllable steering angle. The controller may control a steering device and a brake device of the host vehicle to park the host vehicle along the travel path.

According to the automatic parking control apparatus 200 according to the first embodiment of the present disclosure operated as illustrated in FIG. 3, in a case in which a driver of another vehicle moves a double-parked host vehicle to enable the other vehicle, which is parked, to exit a parking space, the host vehicle may be parked in the parking space in which the other vehicle was parked.

Figure 4:
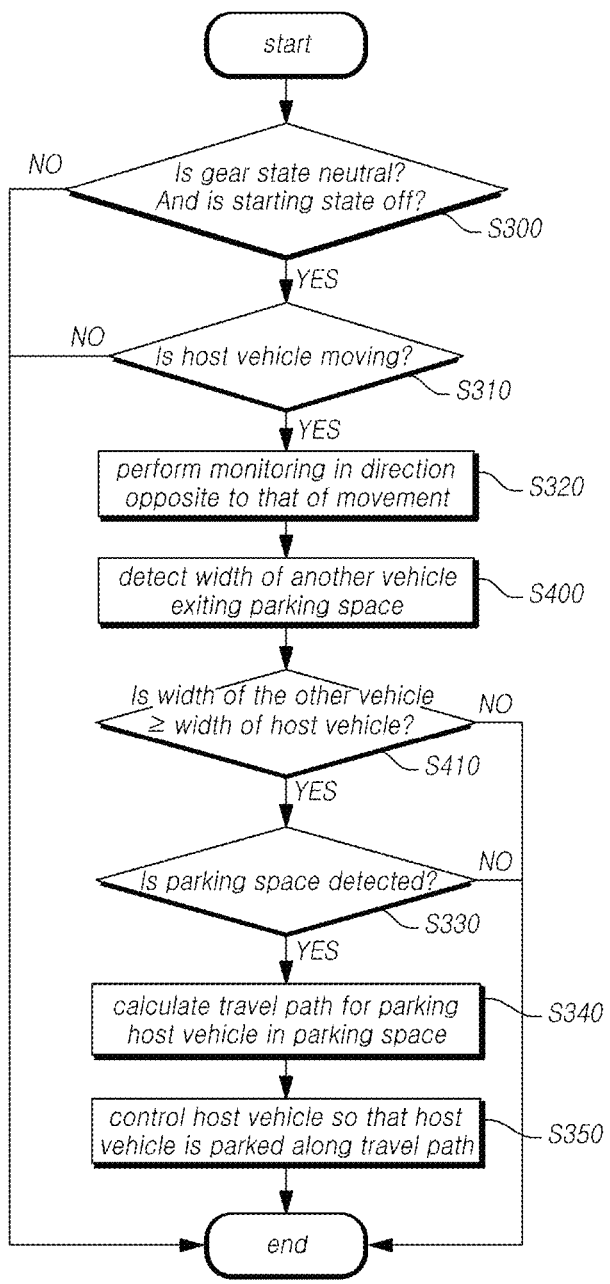
FIG. 4 is a view illustrating another example for describing the operation of the automatic parking control apparatus according to the first embodiment of the present disclosure.

FIG. 4 is a view illustrating another example for describing an operation of the automatic parking control apparatus according to the first embodiment of the present disclosure.

Referring to FIG. 4, the automatic parking control apparatus according to the first embodiment of the present disclosure performs Steps S300 to S350 illustrated in FIG. 3, but, after Step S320 is performed, the parking space detector may further detect a width of the other vehicle exiting from a parking space (S400) and determine whether the detected width of the other vehicle is larger than or equal to a known width of the host vehicle (S410).

In comparing the widths in Step S410, deviation due to an error in the detected width of the other vehicle, a parking clearance of the other vehicle, and the like may be further reflected.

Thus, when the width of the other vehicle is determined to be larger than or equal to the width of the host vehicle (YES in S410), Steps S330 to S350 may be performed.

According to the automatic parking control apparatus according to the first embodiment of the present disclosure operated as illustrated in FIG. 4, there is an advantageous effect of, in a case in which a driver of another vehicle moves a double-parked host vehicle to enable the other vehicle, which is parked, to exit a parking space, determining whether it is possible to park the host vehicle in the parking space in which the other vehicle was parked.

Figure 5:
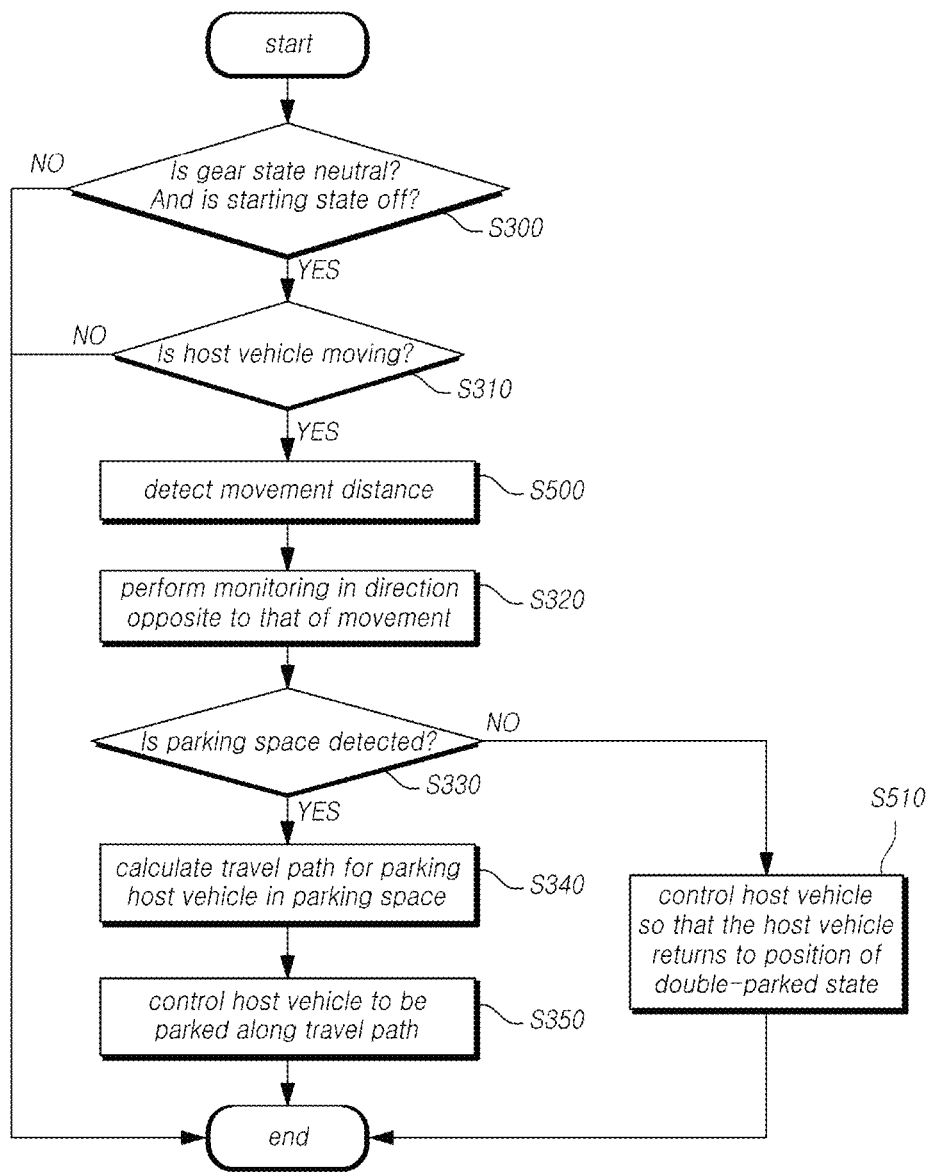
FIG. 5 is a view illustrating an example for describing an operation of an automatic parking control apparatus according to a second embodiment of the present disclosure.

FIG. 5 is a view illustrating an example for describing an operation of the automatic parking control apparatus according to the second embodiment of the present disclosure.

Referring to FIG. 5, the automatic parking control apparatus according to the second embodiment of the present disclosure performs Steps S300 to S350 illustrated in FIG. 3, but, after Step S310 is performed, the movement distance detector, which is further included in the automatic parking control apparatus, may detect a movement distance (S500), and when it is determined that a parking space is not detected (NO in S330), the controller may use the movement distance detected in Step S500 and control the host vehicle so that the host vehicle returns to the initial position at which the host vehicle was double-parked (S510).

As an example, in Step S500, the movement distance detector may integrate a detected steering angle and a detected vehicle speed of the host vehicle and detect a movement distance of the host vehicle, and in Step S510, the controller may control the steering device and the brake device of the host vehicle to control the host vehicle so that the host vehicle returns to the initial position at which the host vehicle was double-parked.

The automatic parking control apparatus according to the second embodiment of the present disclosure operated as illustrated in FIG. 5 may allow a host vehicle to return to an initial position at which the host vehicle was double-parked, even after a driver of another vehicle has moved the double-parked host vehicle to enable the other vehicle, which is parked, to exit a parking space. Thus, there is an advantageous effect of allowing a driver of the host vehicle to easily find the host vehicle.

Figure 6:
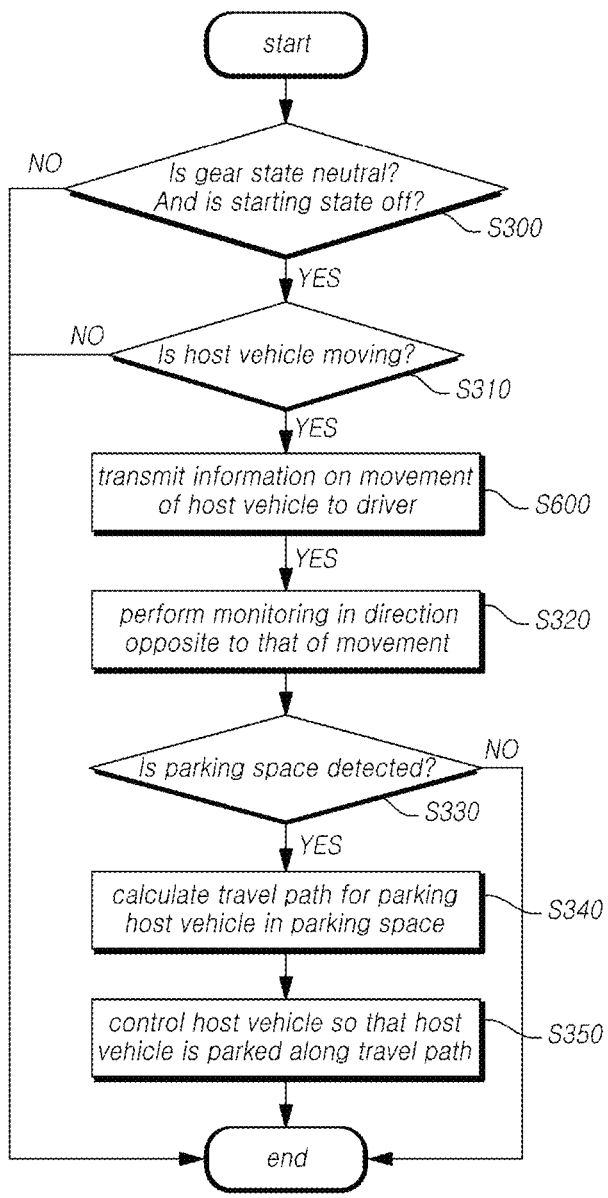
FIG. 6 is a view illustrating an example for describing an operation of an automatic parking control apparatus according to a third embodiment of the present disclosure.

FIG. 6 is a view illustrating an example for describing an operation of an automatic parking control apparatus according to a third embodiment of the present disclosure.

Referring to FIG. 6, the automatic parking control apparatus according to the third embodiment of the present disclosure performs Steps S300 to S350 illustrated in FIG. 3, but when it is determined that the host vehicle is moving (YES in S310), the transmitter, which is further included in the automatic parking control apparatus, may transmit information on the movement of the host vehicle to the driver of the host vehicle (S600).

As an example, the driver of the host vehicle may input information on a device (e.g., terminal) owned by the driver into the transmitter for the transmitter to provide information to the driver of the host vehicle.

When the host vehicle is moved by a driver of another vehicle, the automatic parking control apparatus according to the third embodiment of the present disclosure operated as illustrated in FIG. 6 may provide information related thereto to the driver of the host vehicle. Thus, there is an advantageous effect in that the driver of the host vehicle may be aware of the fact that the host vehicle is not located at the initial position at which the host vehicle was double-parked.

Figure 7:
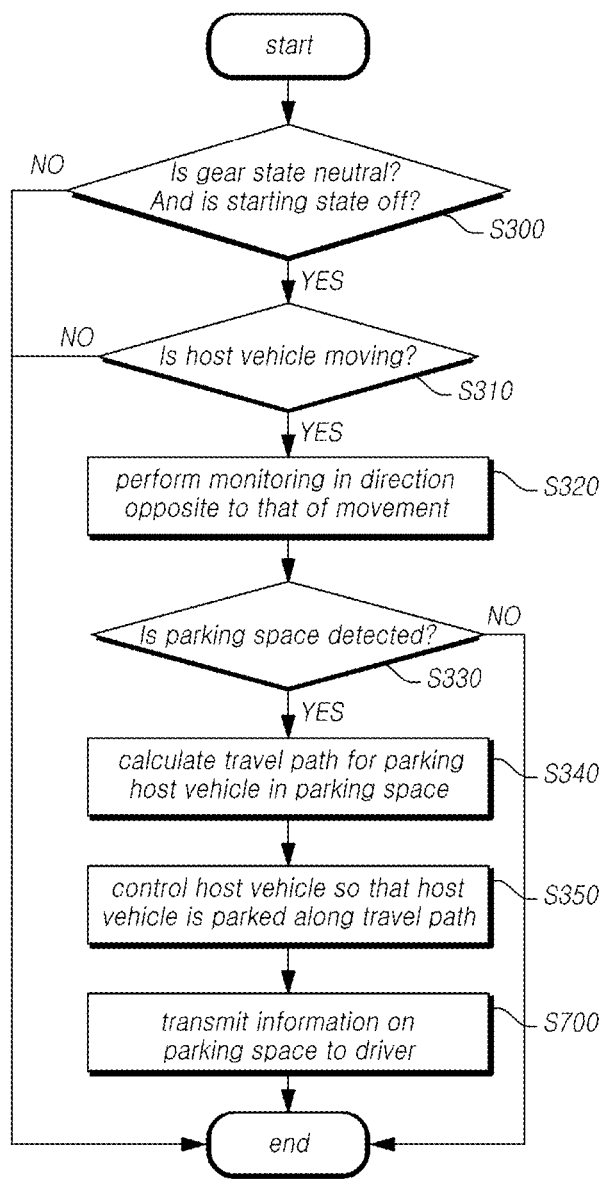
FIG. 7 is a view illustrating another example for describing the operation of the automatic parking control apparatus according to the third embodiment of the present disclosure.

FIG. 7 is a view illustrating another example for describing an operation of the automatic parking control apparatus according to the third embodiment of the present disclosure.

Referring to FIG. 7, the automatic parking control apparatus according to the third embodiment of the present disclosure performs Steps S300 to S350 illustrated in FIG. 3, but when Step S350 is performed, a transmitter, which is further included in the automatic parking control apparatus, may transmit information on the parking space in which the host vehicle is parked to the driver of the host vehicle (S700).

As an example, the driver of the host vehicle may input information on a device (e.g., terminal) owned by the driver into the transmitter for the transmitter to provide information to the driver of the host vehicle.

When the host vehicle is moved to be parked in an empty parking space, the automatic parking control apparatus according to the third embodiment of the present disclosure operated as illustrated in FIG. 7 may provide information related thereto to the driver of the host vehicle. Thus, there is an advantageous effect of allowing the driver of the host vehicle to be aware of the position at which the host vehicle is parked.

Figure 8:
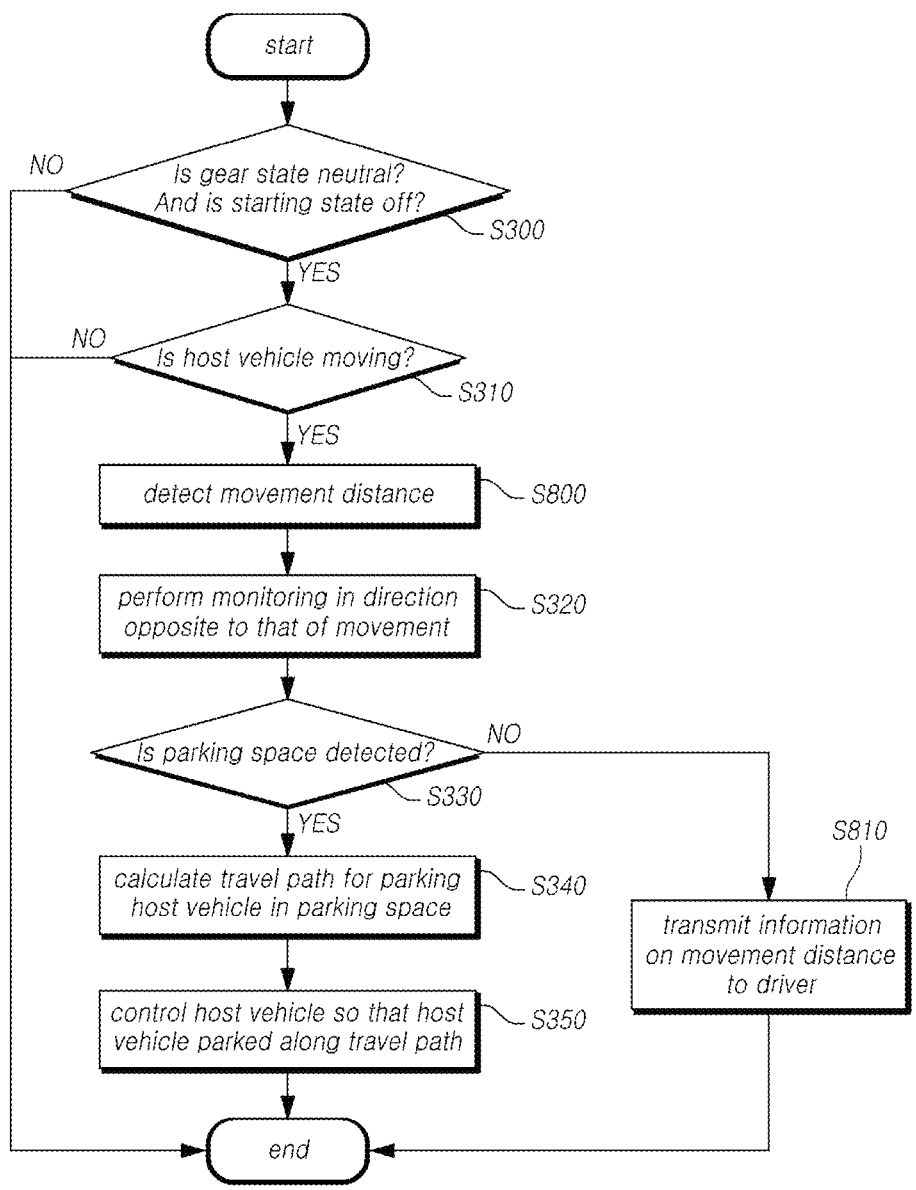
FIG. 8 is a view illustrating an example for describing an operation of an automatic parking control apparatus according to a fourth embodiment of the present disclosure.

FIG. 8 is a view illustrating an example for describing an operation of the automatic parking control apparatus according to the fourth embodiment of the present disclosure.

Referring to FIG. 8, the automatic parking control apparatus according to the fourth embodiment of the present disclosure performs Steps S300 to S350 illustrated in FIG. 3, but when it is determined that the host vehicle is moving (YES in S310), the movement distance detector, which is further included in the automatic parking control apparatus, may detect a movement distance (S800), and when it is determined that a parking space is not detected (NO in S330), a transmitter, which is further included in the automatic parking control apparatus, may transmit information on the movement distance detected in Step S800 to the driver of the host vehicle (S810).

As an example, the driver of the host vehicle may input information on a device (e.g., terminal) owned by the driver into the transmitter for the transmitter to provide information to the driver of the host vehicle.

In addition to an advantageous effect of informing the driver of the host vehicle of the fact that the host vehicle is not located at an initial position at which the host vehicle was double-parked, the automatic parking control apparatus according to the fourth embodiment of the present disclosure operated as illustrated in FIG. 8 has an advantageous effect of informing the driver of the host vehicle of the position at which the host vehicle is present.

Figure 9:
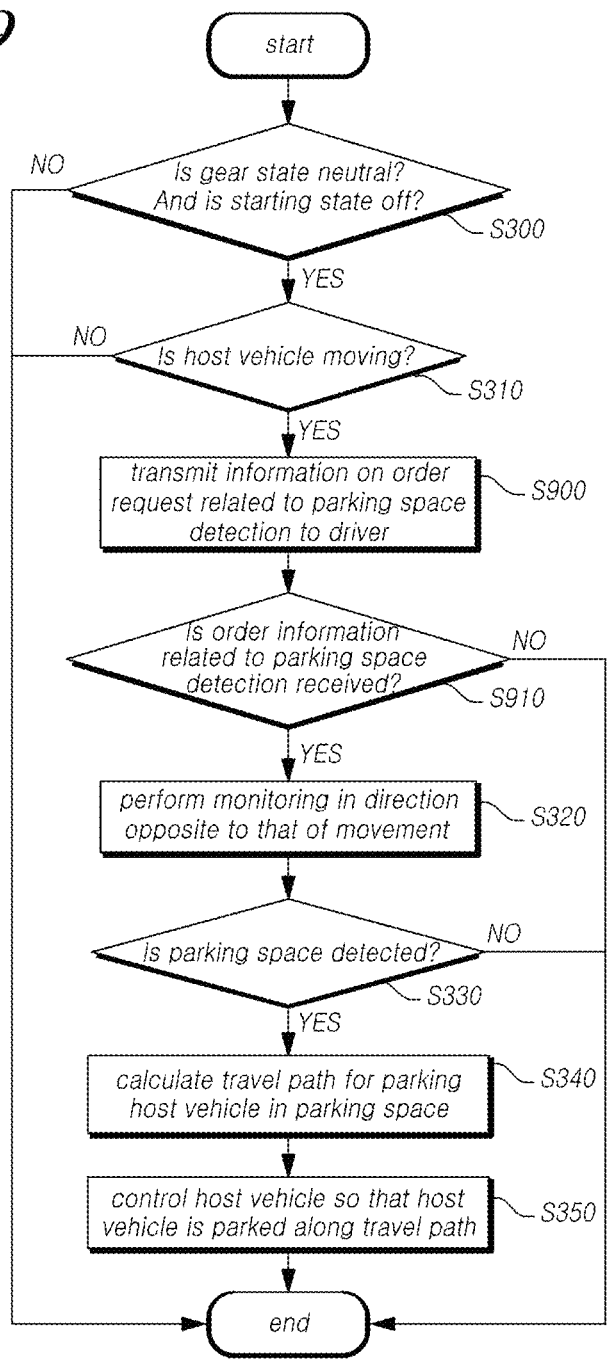
FIG. 9 is a view illustrating an example for describing an operation of an automatic parking control apparatus according to a fifth embodiment of the present disclosure.

FIG. 9 is a view illustrating an example for describing an operation of the automatic parking control apparatus according to the fifth embodiment of the present disclosure.

Referring to FIG. 9, the automatic parking control apparatus according to the fifth embodiment of the present disclosure performs Steps S300 to S350 illustrated in FIG. 3, but when it is determined that the host vehicle is moving (YES in S310), the transmitter-receiver, which is further included in the automatic parking control apparatus, may transmit information on an order request related to whether parking space detection should be performed to the driver of the host vehicle (S900), and determine whether information on an order related to parking space detection is received from the driver of the host vehicle (S910).

As an example, the driver of the host vehicle may input information on a device (e.g., terminal) owned by the driver into the transmitter-receiver and input information on the transmitter-receiver into the owned device for the transmitter-receiver and the driver of the host vehicle to exchange information.

Thus, when it is determined that the information on the order related to parking space detection is received from the driver of the host vehicle (YES in S910), Steps S320 to S350 may be performed.

As illustrated in FIG. 9, in addition to an advantageous effect of informing the driver of the host vehicle of whether the host vehicle is moving, the automatic parking control apparatus according to the fifth embodiment of the present disclosure operated as illustrated in FIG. 9 has an advantageous effect of being operated in accordance with an order input by the driver of the host vehicle.

Figure 10:
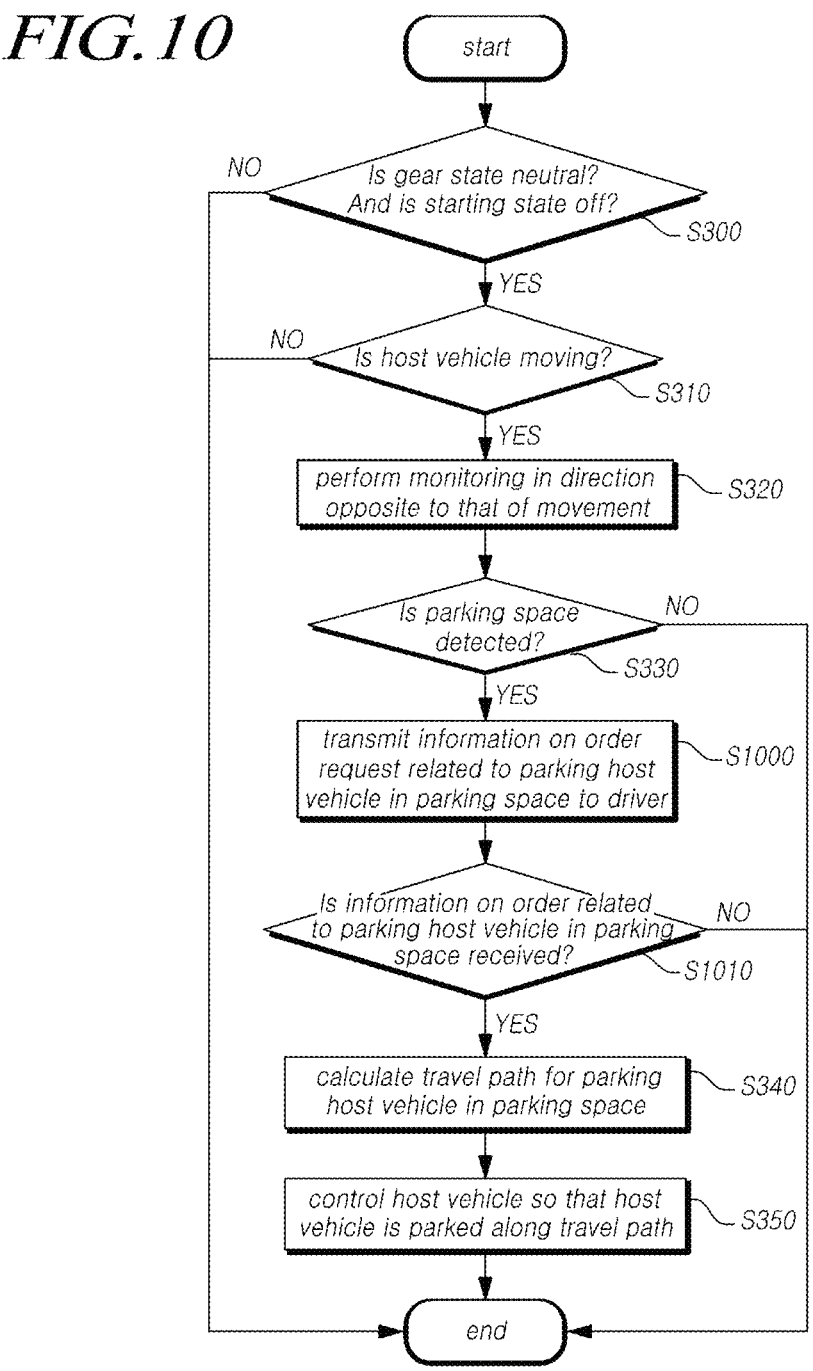
FIG. 10 is a view illustrating another example for describing the operation of the automatic parking control apparatus according to the fifth embodiment of the present disclosure.

FIG. 10 is a view illustrating another example for describing an operation of the automatic parking control apparatus according to the fifth embodiment of the present disclosure.

Referring to FIG. 10, the automatic parking control apparatus according to the fifth embodiment of the present disclosure performs Steps S300 to S350 illustrated in FIG. 3, but when it is determined that a parking space is detected (YES in S330), the transmitter-receiver, which is further included in the automatic parking control apparatus, may transmit information on an order request related to whether parking of the host vehicle in the detected parking space should be performed to the driver of the host vehicle (S1000) and determine whether information on an order related to the performance of parking is received from the driver of the host vehicle (S1010).

As an example, the driver of the host vehicle may input information on a device (e.g., terminal) owned by the driver into the transmitter-receiver and input information on the transmitter-receiver into the owned device for the transmitter-receiver and the driver of the host vehicle to exchange information.

Thus, when it is determined that the information on the order related to the parking performance is received from the driver of the host vehicle (YES in S1010), Steps S340 and S350 may be performed.

As illustrated in FIG. 10, in addition to an advantageous effect of informing the driver of the host vehicle of whether the host vehicle is moving and whether a parking space has been detected, the automatic parking control apparatus according to the fifth embodiment of the present disclosure operated as illustrated in FIG. 10 has an advantageous effect of being operated in accordance with an order input by the driver of the host vehicle.

Hereinafter, an automatic parking control method, which is an operation performed by the automatic parking control apparatus described above using FIGS. 2 to 10, will be briefly described.

Figure 11:
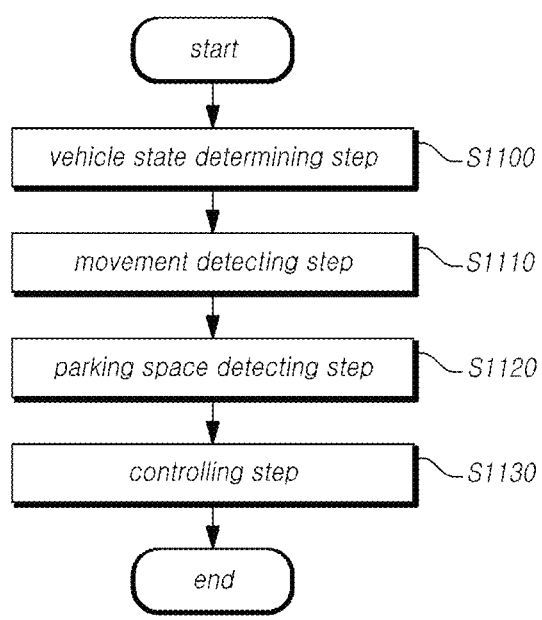
FIG. 11 is a view illustrating a flowchart of an automatic parking control method according to an embodiment of the present disclosure.

FIG. 11 is a view illustrating a flowchart of an automatic parking control method according to an embodiment of the present disclosure.

Referring to FIG. 11, an automatic parking control method may include a vehicle state determining step (S1100) in which whether a host vehicle is in a double-parked state, in which a gear state of the host vehicle is neutral (N) and a starting state of the host vehicle is off, is determined, a movement detecting step (S1110) in which, when it is determined that the host vehicle is in the double-parked state, whether the host vehicle is moving is detected, a parking space detecting step (S1120) in which, when it is detected that the host vehicle is moving, monitoring in a direction opposite to that of the detected movement is performed and a parking space is detected, and a controlling step (S1130) in which, when the parking space is detected, a travel path for parking the host vehicle in the detected parking space is calculated and the host vehicle is controlled so that the host vehicle is parked along the travel path.

In the vehicle state determining step (S1100) of the automatic parking control method according to an embodiment of the present disclosure, when the gear state of the host vehicle is determined as neutral (N) on the basis of information on the gear received from a gear sensor configured to detect the gear state of the host vehicle, and the starting state of the host vehicle is determined as off on the basis of information received from a starting sensor configured to detect the starting state of the host vehicle, the host vehicle may be determined as being in the double-parked state.

As an example, the gear sensor may detect a currently-engaged gear by detecting a change in accordance with the position of a gear rod or a change in accordance with an engaged gear (e.g., a number of rotations or the like in accordance with a fastened gear ratio), but embodiments are not limited thereto.

The starting sensor may detect a current starting state of the host vehicle by detecting a change in accordance with the position of a starting key or a change in accordance with engine starting (e.g., a fuel flow or the like), but embodiments are not limited thereto.

In the movement detecting step (S1110) of the automatic parking control method according to an embodiment of the present disclosure, when the host vehicle is determined as being in the double-parked state in the vehicle state determining step (S1100), whether the host vehicle is moving may be detected on the basis of information received from an activated movement sensor.

The movement sensor may include a wheel speed sensor capable of detecting a wheel speed in accordance with movement of the host vehicle, an acceleration sensor capable of detecting an acceleration in accordance with movement of the host vehicle, or the like.

In the parking space detecting step (S1120) of the automatic parking control method according to an embodiment of the present disclosure, when the host vehicle is detected as moving in the movement detecting step (S1110), a parking space may be detected on the basis of information received from an activated object sensor.

In this case, the activated object sensor may be limited to an object sensor configured to perform monitoring in the direction opposite to that of the movement detected in the movement detecting step (S1110), and the object sensor may be a camera, a radar, a LIDAR, or an ultrasonic sensor.

Furthermore, in the parking space detecting step (S1120), a width of another vehicle exiting the parking space may be further detected, the detected width of the other vehicle may be compared with a known width of the host vehicle, and whether it is possible to park the host vehicle in the parking space may be further detected.

As an example, when the detected width of the other vehicle is larger than the width of the host vehicle, it may be detected that it is possible to park the host vehicle in the parking space in which the other vehicle, which exited the parking space, was parked. Conversely, when the detected width of the other vehicle is smaller than the width of the host vehicle, it may be detected that it is not possible to park the host vehicle in the parking space in which the other vehicle, which exited the parking space, was parked.

In the controlling step (S1130) of the automatic parking control method according to an embodiment of the present disclosure, when a parking space is detected in the parking space detecting step (S1120), a travel path for parking the host vehicle in the detected parking space may be calculated, and the host vehicle may be controlled so that the host vehicle is parked along the travel path.

The travel path may be calculated on the basis of a movement path of the host vehicle in accordance with a known controllable steering angle. Also, in the controlling step (S1130), a steering device and a braking device of the host vehicle may be controlled for so that the host vehicle is parked along the travel path.

According to the automatic parking control method according to an embodiment of the present disclosure operated as described above, in a case in which a driver of another vehicle moves a host vehicle to enable the other vehicle, which is parked, to exit a parking space, there is an advantageous effect of allowing the host vehicle to be parked in the parking space in which the other vehicle was parked.

The automatic parking control method of the present disclosure may further include a movement distance detecting step in which, when movement of the host vehicle is detected in the automatic parking control method according to an embodiment of the present disclosure illustrated in FIG. 11, a movement distance of the host vehicle is detected. Thus, the controlling step may further include a function of, when a parking space is not detected, using a detected movement distance of the host vehicle and controlling the host vehicle so that the host vehicle returns to an initial position at which the host vehicle was double-parked.

In addition, the automatic parking control method of the present disclosure may perform all of the operations that the automatic parking control apparatus of the present disclosure described above with reference to FIGS. 2 to 10 performs.

As described above, according to the present disclosure, an automatic parking control apparatus and an automatic parking control method capable of, when a parking space becomes available in a situation in which a host vehicle is double-parked, parking the host vehicle in the available parking space can be provided.

The above description and the accompanying drawings illustratively show the technical spirit of the present disclosure, and one of ordinary skill in the art to which the present disclosure pertains should be able to make various modifications and changes such as combining, separating, substituting, and changing configurations within the scope not departing from essential features of the present disclosure. Therefore, the present embodiments are for describing the technical spirit of the present disclosure instead of limiting the same, and the scope of the present technical spirit is not limited by the embodiments herein. The scope of the present disclosure should be interpreted by the claims below, and all technical spirits within the scope equivalent to the claims should be interpreted as belonging to the scope of the present disclosure.

What is claimed is:

1. An automatic parking control apparatus comprising:
   a vehicle state determiner configured to determine whether a gear state of a host vehicle is neutral (N) and a starting state of the host vehicle is off;
   a movement detector configured to detect whether the host vehicle is being moved by an external force;
   a parking space detector configured to, when the gear state of the host vehicle is neutral (N), and the starting state of the host vehicle is off, in response to detection that the host vehicle is being moved by the external force, start to detect a parking space; and
   a controller configured to, when the gear state of the host vehicle is neutral (N), the starting state of the host vehicle is off, and the parking space is detected, calculate a travel path for parking the host vehicle in the detected parking space and, when the host vehicle stops being moved by the external force, control the host vehicle so that the host vehicle is parked to the detected parking space along the travel path, and when the controller completes parking the host vehicle on the detected parking space, transmit a location of the host vehicle to a device of a driver of the host vehicle to notify the driver about a location where the host vehicle is parked on the detected parking space by the controller after the starting state of the host vehicle is off.

2. The automatic parking control apparatus of claim 1, wherein the parking space detector further detects information on another vehicle exiting the parking space, compares a length or width included in the information on the other vehicle with a known length or width of the host vehicle, and further detects whether it is possible to park the host vehicle in the parking space.

3. The automatic parking control apparatus of claim 1, wherein the parking space detector is configured to, when the host vehicle is being moved by the external force, detect the parking space in a direction opposite to a direction that the host vehicle is being moved by the external force.

4. The automatic parking control apparatus of claim 3, wherein the parking space detector is configured to detect exiting of another vehicle exiting from the parking space in the direction opposite to the direction that the host vehicle is being moved by the external force when the host vehicle stops being moved by the external force.

5. The automatic parking control apparatus of claim 1, wherein the parking space detector further detects information on another vehicle exiting from the parking space, compares the information on the other vehicle with parking space scan information detected before the starting state of the host vehicle is off, and further detects whether it is possible to park the host vehicle in the parking space.

6. The automatic parking control apparatus of claim 1, further comprising a movement distance detector configured to, when the host vehicle is being moved by the external force, detect a movement distance of the host vehicle,
   wherein, when the parking space is not detected, the controller uses the movement distance of the host vehicle and controls the host vehicle so that the host vehicle returns to a position where the host vehicle is positioned before the host vehicle is moving.

7. The automatic parking control apparatus of claim 1, further comprising a transmitter configured to provide information to the driver of the host vehicle,
   wherein, when movement of the host vehicle is detected, the transmitter transmits information on the movement of the host vehicle to the driver.

8. The automatic parking control apparatus of claim 1, further comprising a transmitter configured to provide information to the driver of the host vehicle,
   wherein, when the host vehicle is parked along the travel path, the transmitter transmits information on the parking space to the driver.

9. The automatic parking control apparatus of claim 1, further comprising:
   a movement distance detector configured to, when movement of the host vehicle is detected, detect a movement distance of the host vehicle; and
   a transmitter configured to provide information to the driver of the host vehicle,
   wherein, when the parking space is not detected while the host vehicle is being moved by the external force, the transmitter transmits information on the movement distance of the host vehicle to the driver.

10. The automatic parking control apparatus of claim 1, further comprising a transmitter-receiver configured to exchange information with the driver of the host vehicle, wherein:
the transmitter-receiver transmits information on an order request related to detection of the parking space to the driver and receives information on an order of the driver related thereto; and
the parking space detector detects the parking space in accordance with the order of the driver.

11. The automatic parking control apparatus of claim 1, further comprising a transmitter-receiver configured to exchange information with the driver of the host vehicle, wherein:
the transmitter-receiver transmits information on an order request related to parking of the host vehicle in the parking space to the driver and receives information on an order of the driver related thereto; and
the controller parks the host vehicle in the parking space in accordance with the order of the driver.

12. The automatic parking control apparatus of claim 1, wherein the controller is configured to, when the parking space is not detected while the host vehicle is being moved by the external force, transmit, to the device of the driver of the host vehicle, a distance that the host vehicle is moved by the controller after the starting state of the host vehicle is off.

13. The automatic parking control apparatus of claim 1, wherein the parking space detector is configured to: when the gear state of the host vehicle is neutral (N) and the starting state of the host vehicle is off, detect a width and/or length of an other vehicle exiting the parking space, detect whether the width and/or length of the other vehicle is greater than a predetermined value, and in response to detection that the width and/or length of the other vehicle is greater than the predetermined value and the host vehicle is being moved by the external force, start to detect the parking space.

14. An automatic parking control method comprising:
determining whether a gear state of a host vehicle is neutral (N) and a starting state of the host vehicle is off;
detecting whether the host vehicle is being moved by an external force;
when it is determined that the gear state of the host vehicle is neutral (N) and the starting state of the host vehicle is off, in response to detection that the host vehicle is being moved by the external force, starting to detect a parking space; and
when the gear state of the host vehicle is neutral (N), the starting state of the host vehicle is off, and the parking space is detected, calculating a travel path for parking the host vehicle in the detected parking space, when the host vehicle stops being moved by the external force, controlling, by a controller, the host vehicle so that the host vehicle is parked to the detected parking space along the travel path, and when the controller completes parking the host vehicle on the detected parking space, transmitting a location of the host vehicle to a device of a driver of the host vehicle to notify the driver about a location where the host vehicle is parked on the detected parking space after the starting state of the host vehicle is off.

15. The automatic parking control method of claim 14, further comprising detecting information on an other vehicle exiting the parking space, and comparing a length or width included in the information of the other vehicle with a known length or width of the host vehicle to determine whether it is possible to park the host vehicle in the parking space.

16. The automatic parking control method of claim 14, further comprising, when the host vehicle is being moved by the external force, detecting a movement distance of the host vehicle, and
controlling, by the controller, the host vehicle using the movement distance of the host vehicle so that the host vehicle returns to a position where the host vehicle is positioned before the host vehicle is moving.

17. The automatic parking control method of claim 14, further comprising, when the parking space is not detected while the host vehicle is being moved by the external force, transmitting, to the device of the driver of the host vehicle, a distance that the host vehicle is moved after the starting state of the host vehicle is off.

18. The automatic parking control method of claim 14, further comprising, when the gear state of the host vehicle is neutral (N) and the starting state of the host vehicle is off, detecting a width and/or length of an other vehicle exiting the parking space, and detecting whether the width and/or length of the other vehicle is greater than a predetermined value,
wherein the starting to detect the parking space comprises, in response to detection that the width and/length of the other vehicle is greater than the predetermined value and the host vehicle is being moved by the external force, starting to detect the parking space.

\* \* \* \* \*